March 25, 1969 G. B. LOPER 3,435,195
CORRELATING SEISMIC SIGNALS
Filed April 6, 1965

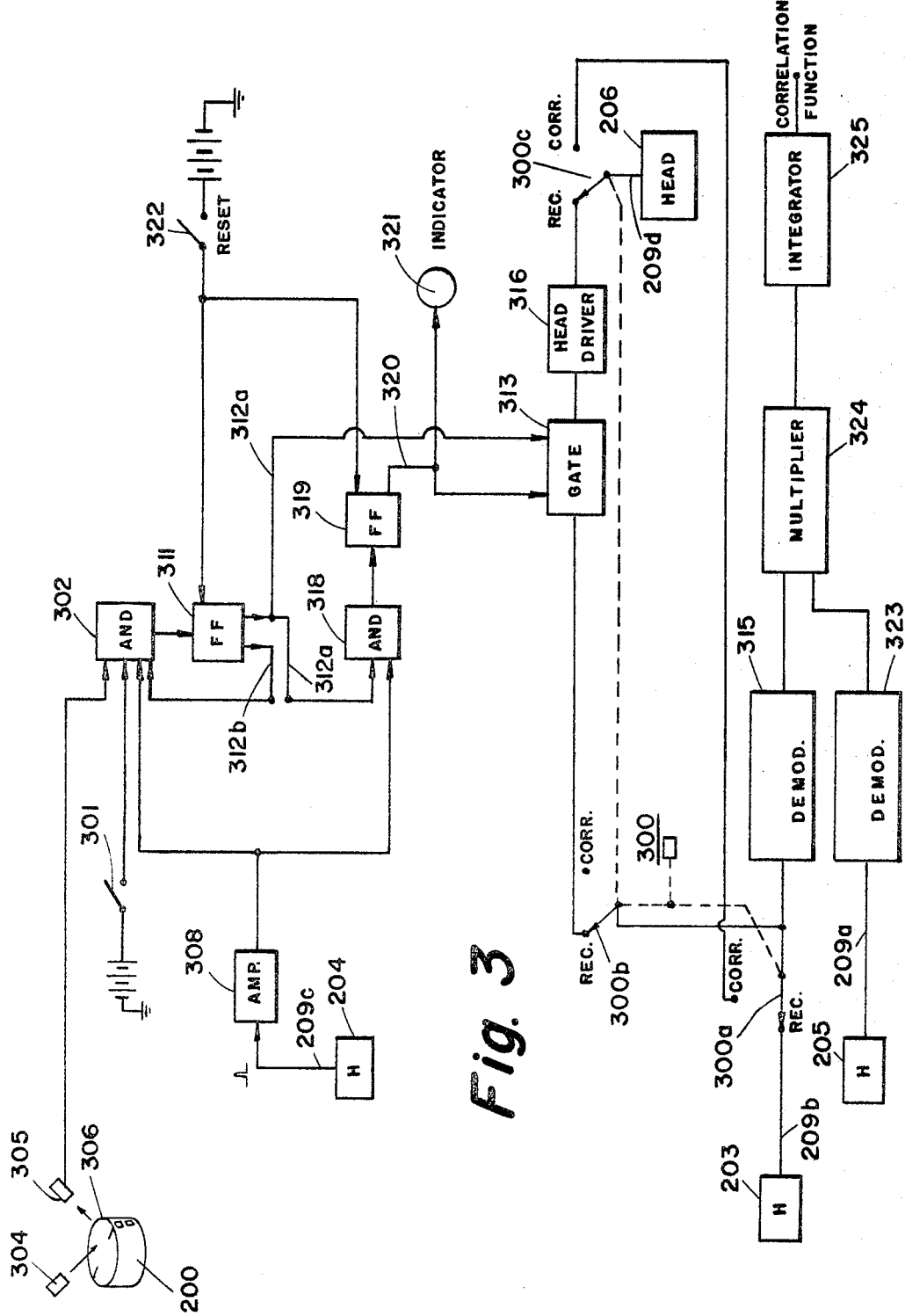

United States Patent Office  3,435,195
Patented Mar. 25, 1969

3,435,195
CORRELATING SEISMIC SIGNALS
George B. Loper, Dallas, Tex., assignor to Mobil Oil
Corporation, a corporation of New York
Filed Apr. 6, 1965, Ser. No. 445,909
Int. Cl. G06g 7/19; G06f 15/34
U.S. Cl. 235—181                                    6 Claims

ABSTRACT OF THE DISCLOSURE

This specification discloses a method and apparatus for cross-correlating seismic data comprised of an input signal and an output signal which are recorded on a magnetic tape to produce a cross-correlation function. A magnetic tape having an input signal and an output signal recorded thereon is moved past a fast rotating drum having transducers mounted on the periphery thereof. A fixed magnetic medium is disposed about the periphery of the rotating drum. The input signal is scanned from the magnetic tape and recorded on the fixed magnetic medium by means of the transducers and associated apparatus. The input signal and output signal are scanned by the transducers and applied to a multiplier and thence to an integrator to produce a cross-correlation function representing the cross-correlation of the input signal and the output signal.

---

This invention relates to methods and appartus for performing a correlation operation and more particularly to cross-correlating two seismic signals which have been recorded on separate tracks of a magnetic tape.

In the process of data there is a frequency requirement for apparatus which will perform a rapid cross-correlation operation on two signals. One example of a situation in which there is such a requirement is in the processing of seismic signals. These seismic signals represent the reflection of seismic energy from subsurface reflecting interfaces. In order to transform these seismic signals into a form which can be readily interpreted by a seismologist, a cross-correlation operation is sometimes necessary.

More particularly, in one type of seismic prospecting vibratory energy is transmitted into the earth. This vibratory energy, hereinafter referred to as the input signal, is transmitted through the earth and reflected from subsurface interfaces. The reflected vibratory energy is detected at a detecting station at the earth's surface and recorded. The recorded signal, hereinafter referred to as the output signal, contains information regarding the nature and location of the subsurface reflecting interfaces. However, in order to most easily extract this information from the output signal, it is necessary to first correlate the output signal with the input signal. The cross-correlation function which is the result of this operation provides a good indication of the existence of, and location of, subsurface reflecting interfaces. Such a seismic prospecting technique is described, for example, in U.S. Patent 2,688,-124, Doty, et al. and 2,989,726, Crawford et al.

In seismic prospecting of the type just described, and in other situations in which a correlation operation is required, there is required apparatus which will quickly and accurately cross-correlate the input signal with the output signal.

This cross-correlation operation is not easily performed because in such an operation it is required that all points on the input signal be multiplied by corresponding points on the output signal. The products thus obtained are summed to form one point on the output cross-correlation function. Then, the input signal is shifted an increment of time with respect to the output signal and again all points on the input signal are multiplied by corresponding points on the output signal. The products are summed to form another point on the cross-correlation function. The time-shifting, multiplying, and summing operations are repeated until the input signal has been shifted throughout the entire output signal. A number of steps are required and heretofore apparatus which has been employed for this operation has been cumbersome and the operation performed on the apparatus has been time-consuming.

Accordingly, it is an important object of the present invention to provide improved apparatus and techniques for performing a rapid cross-correlation of two signals which are recorded on magnetic tape.

In accordance with one embodiment of this invention there is provided a tape transport system for transporting at a slow constant speed the tape on which the input and output signals are recorded. Positioned in playback relationship with this slowly moving tape is a rotatable drum which carries a plurality of playback and record heads. Two playback heads are disposed in playback relationship to the slowly moving tape. A fixed tape is also mounted in playback relationship with another of the heads on the rotating drum. Initially, the input signal is transferred from the slowly moving tape to the fixed tape. After this transfer has been accomplished the correlation operation begins.

Upon each rotation of the drum, one of the playback heads scans a portion of the output signal and produces this signal at the output of the playback head. Simultaneously, another playback head on the drum scans the input signal which has been recorded on the fixed tape. The input signal and the portion of the output signal are applied to an analog multiplier, the output of which is applied to an integrator. Each rotation of the rotatable drum results in a different portion of the output signal being played back, because of the slow movement of the tape past the drum. Therefore, each rotation of the drum produces, through the resulting multiplication and integration of the input signal and the portion of the output signal, a point on the output cross-correlation function. In this manner there is quickly and accurately obtained a cross-correlation function representing the cross-correlation of the input signal and the output signal.

In acocrdance with another important aspect of this invention two sets of transducer heads are provided. These two sets of heads are positioned 180° apart on the rotatable drum. The moving and fixed tapes are both wrapped around 180° of the drum so that when one set of heads leaves engagement with the tapes, the other set of heads comes into engagement with the tapes. In this manner there is produced a continuous cross-correlation function without interruption for repositioning the heads and the rotational speed requirement for the drum is reduced.

The foregoing and other objects, features and advantages of the invention will be better understood from the following more detailed description and appended claims in conjunction with the drawings in which:

FIG. 3 shows the circuitry utilized to perform the multiplication, integration and transfer operations.

Figure 1:
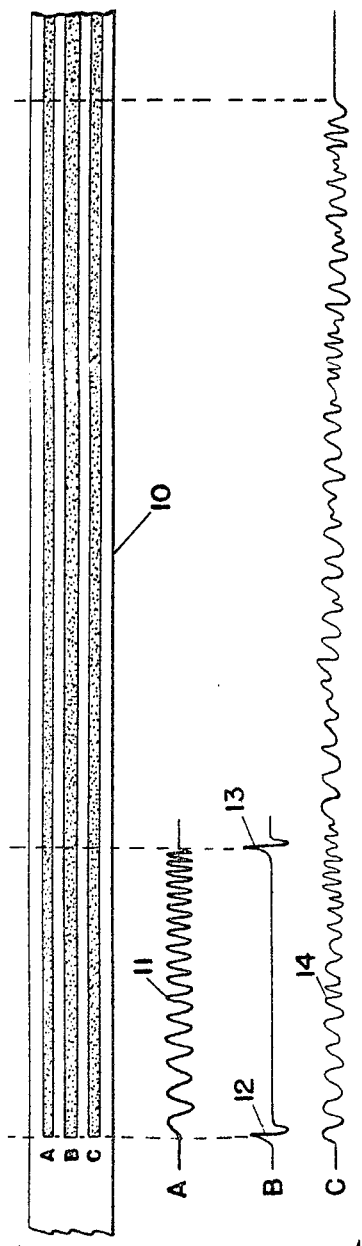
FIG. 1 shows the magnetic tape having three tracks recorded thereon and showing the wave forms of the signals recorded on these three tracks.

Referring now to FIG. 1, there is shown a magnetic tape 10 having three tracks, denoted A, B and C, recorded thereon. The signals on the three recording tracks may be recorded directly in the field in accordance with the techniques disclosed in the two patents previously referred to. By way of example, the input signal, representing the vibratory energy which is transmitted into the earth, is recorded on track A. The wave form of this input signal is indicated at 11. In accordance with a technique commonly used in this type of seismic propecting, the input signal has a unique wave form; that is, it is not exactly repetitive. As shown in FIG. 1 the input signal varies in frequency, with the frequency increasing as time progresses.

In order to indicate the time occurrence of the beginning and the end of the input signal, there is recorded on track B a pulse 12 coincident with the beginning of the input signal, and a pulse 13 coincident with the end of the input signal.

After the vibratory energy has traversed a portion of the earth and been reflected from subsurface interfaces, it is detected and recorded on track C of the tape 10. A typical wave form of such an output signal is shown at 14. As can be seen, it is quite difficult to determine at which points on the wave form 14 reflections of the input signal 11 occur. However, by cross-correlating the input signal 11 with the output signal wave form 14, there is produced a cross-correlation function which does indicate the time occurrence of reflections.

Figure 2A:
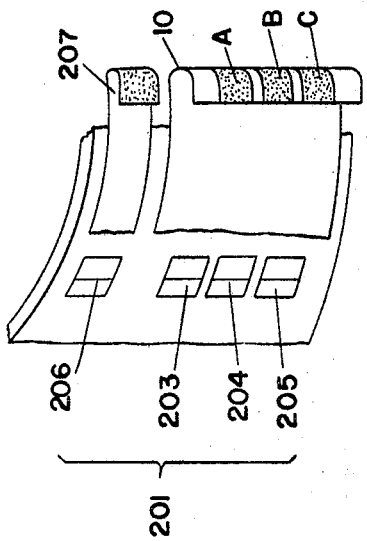
FIG. 2A shows the details of the mounting of the playback and record heads on the rotatable drum.
Figure 2:
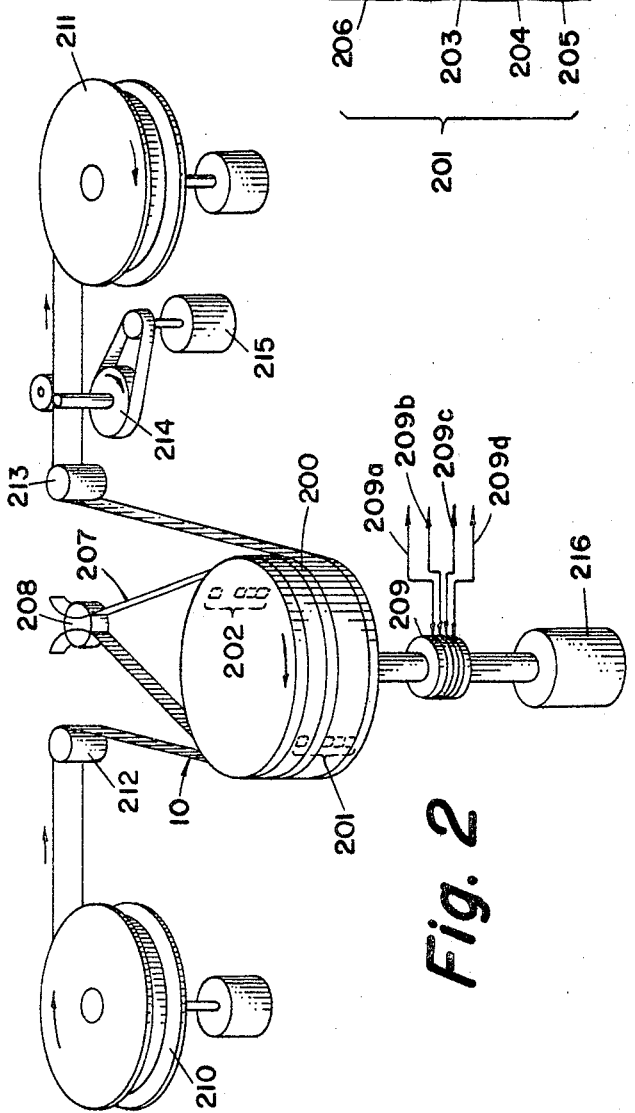
FIG. 2 shows the tape transport system, rotatable drum and associated equipment provided in accordance with this invention.

Apparatus provided in accordance with this invention for performing such a cross-correlation operation is shown in FIG. 2. This apparatus includes a tape transport system for moving the tape 10 around the periphery of a rotatable drum 200. Mounted on the drum 200 are two sets of transducer heads denoted 201 and 202. These heads may be of the type which can perform both magnetic recording or magnetic playback. The two sets of heads 201 and 202 are disposed 180° apart on the rotatable drum. Two sets of heads are provided so that one set is in reading relationship with the tape 10 while the other set is out of reading relationship with the tape. This arrangement of two sets of heads, one in contact with the tape and one out of contact with the tape, facilitates reading of the tapes without utilizing an excessively high rotation speed for drum 200. Also, the use of two sets of heads insures that a continuous cross-correlation function will be produced without interruption while the heads are repositioned.

The mounting of the set of heads 201 is shown in more detail in FIG. 2A. The set of heads 201 includes playback heads 203, 204 and 205 disposed in playback relationship with the tracks A, B and C respectively of the tape 10. The set of heads 201 also includes a playback-record head 206 which is disposed in playback and recording relationship to a fixed tape 207. The fixed tape 207 is wrapped around the periphery of drum 200 and is secured to the fixed member 208.

The set of heads 202 similarly includes four heads, one head disposed in reading and recording relationship to fixed tape 207 and three heads disposed in reading relationship to tracks A, B and C of the tape 10. Corresponding heads of the sets 201 and 202 are connected in parallel. That is, the head 203 is connected in parallel with a head in set 202 which is disposed in proximity to track A; the head 204 is connected in parallel to the head in set 202 which is disposed in proximity to track B, and so on.

External connections to the four heads 203–206 are provided by the slip-ring and brush assembly 209 which connects signals from each parallel-connected pair of heads to one of the four external leads 209a–209d. These leads are connected to the circuitry of FIG. 3 as will be subsequently explained.

The tape transport system which transports the moving tape past the heads on the rotatable drum includes a supply reel 210 and a takeup reel 211. Guiding rollers 212 and 213 are positioned so that the moving tape 10 comes in contact with 180° of the periphery of the drum 200.

A conventional tape drive 214 driven by motor 215 imparts a constant speed to the moving tape.

The rotatable drum 200 is rotated by a motor 216 at a speed which is quite high compared with the constant speed of the tape 10. In this manner there is produced a scanning of the set of heads 201 across a portion of the output signal on the moving tape and across the complete input signal on the fixed tape. This scan takes place in the time required for the moving tape 10 to move only a small increment which may be, for example, 2 milliseconds of tape time. Then, when the set of heads 202 comes into contact with the moving tape 10 and the fixed tape 207, another scan is performed, this scan encompassing a portion of the output signal which is shifted in time by 2 milliseconds with respect to the portion scanned upon the first rotation of the drum.

Before proceeding with a more complete description of the operation of the system, there will first be described the circuitry of FIG. 3 which performs the actual multiplication and integration operations and also performs the transfer operations.

In addition to the transfer and correlation circuitry, FIG. 3 shows the drum 200 and heads 203–206 in simplified form. The connections 209a–209d, which connect the heads to the transfer and correlation circuitry have also been shown. However, the slip-ring and brush assembly 209 which connects heads 203–206 to external connections 209a–209b has been omitted to simplify the drawing.

First, the system will be described in its operation of transferring the input signal from the moving tape 10 to the fixed tape 207. The operator sets the two-position switch 300, which has a recording and a correlating position, to the recording position. The switch 300 has three contacts: 300a, 300b and 300c, all of which are set to the record position. Next, the operator depresses the manual start switch 301 which places an enabling voltage on AND-gate 302. The system is now in a condition for operation provided that the magnetic heads of the rotating drum 200 are in the correct position relative to the slow moving tape. The rotating drum 200 is shown in simplified form in FIG. 3.

The correct positioning of the heads carried by drum 200 is sensed by a circuit including a bulb 304 and a photocell 305. Light from the bulb 304 is reflected from the drum 200 and impinges on photocell 305. A mark 306 is provided on drum 200 to indicate when the drum is in the correct position. When this mark is sensed by the photocell, a position pulse is produced which is applied to AND-gate 302 to render it operative.

When the pulse 12 from track B is produced at the playback head 204, it passes through amplifier 308 and through the AND-gate 302 to set the flip-flop 311. When this flip-flop is set, a voltage is produced on its output line 312a which enables transfer-gate 313. The output from flip-flop 311 on output line 312a also enables AND-gate 318 so that pulse 13 will pass through this gate at the end of the input signal.

The input signal 11 which is on track A of the slow moving tape 10 and which is picked up by playback head 203 passes through contact 300a, contact 300b, transfer-gate 313, which is now open, to the head-driver 316. The output of this head-driver is connected through the contact 300c to playback-record head 206 which is in contact with the fixed tape 207. As a result, the input signal 11, carried on track A of the slow moving tape 10, is transferred to the fixed tape 207.

The end of the input signal is indicated by the pulse 13 on track B of the moving tape 10. This signal is picked up by the playback head 204 and passes through amplifier 308 to AND-gates 302 and 318.

AND-gate 318 is open at this time, as indicated hereinabove. The pulse 13 passes through this gate to set flip-flop 319. When this flip-flop is in the set condition, its output 320 disables transfer-gate 313. The voltage of output 320 is also applied to an indicator 321 which indicates to the operator that the transfer of the input signal 11 from the slow moving tape 10 to the fixed tape 207 has been completed.

At this time, the operator can rewind the moving tape to its initial position for performing the correlation operation. The operator will also depress a manual reset switch 322 which applies a reset voltage to flip-flops 311 and 319. When flip-flop 311 is reset, the output 312b has a voltage thereon which enables AND-gate 302 and the output 312a has a voltage thereon which disables AND-gate 318. Accordingly, upon the next transfer operation, the pulse 12 from one of the playback heads 204 can pass through AND-gate 302.

Turning now to the operation of multiplication and integration, this operation begins when the operator sets the switch 300 to the correlating position, thereby changing the positions of the three contacts 300a, 300b and 300c. Then playback-record head 206 reads the input signal, as recorded on the fixed tape 207. This signal passes through contact 300a, and demodulator 315 to one input of the multiplier 324. At the same time, playback head 205 reads the output signal from track C of the moving tape 10. This signal passes through demodulator 323 to the other input of multiplier 324. The output of multiplier 324 is applied to the integrator 325, the output of which can be recorded or displayed as desired. This multiplication and integration process represents a well-known procedure. Descriptions of electronic multipliers and integrators are, for example, to be found in "Electronic Analog Computers," by Korn and Korn, McGraw-Hill Book Company, 1956, pages 13, 18 to 20 and 171–184.

The complete operation of the correlation apparatus will now be described. The supply reel 210 carrying the moving tape 10 is positioned in the tape transport system as shown in FIG. 2. The motor 216 is energized so that the drum 200 is constantly rotating. The operator manually depresses the start switch 301, FIG. 3. As the tape 10 begins to move, there is produced the pulse 12, FIG. 1, which indicates the beginning of the input signal. The pulse 12 and the position pulse produced by photocell 305 enable the transfer circuitry of FIG. 3 to pass the input signal, played back by playback head 203, to pass to the playback-record head 206 which records the input signal on the fixed tape 207.

As the tape moves from the supply reel 210 to the drum 200, pulse 12 will start occurring on each ½ revolution of the drum 200 long before the complete input signal is wrapped around 180° of the drum. We must wait until the complete input signal can be played before attempting to rerecord it on the fixed tape. Mark 306 will span enough width so that the position pulse will be slightly longer than the distance moved by pulse 12 during 180° revolution of the drum. Thus coincidence must occur.

After the input signal has been transferred to the fixed tape 207, the indicator 321, FIG. 3, will be energized to indicate to the operator that the correlation operation can begin. The moving tape 10 is rewound to its initial position and the switch 300, FIG. 3, is manually moved to the correlate position. Now, as the drum 200 rotates, the input signal from fixed tape 207 will be picked up by playback-record head 206 (FIG. 2) and connected by way of the lead 209d, contact 300c, contact 300a, and through demodulator 315 to the multiplier 324. Simultaneously, there will be picked up a portion of the output signal. This will be played back by playback head 205 and applied by way of the lead 209a and demodulator 323 to the multiplier 324. As the set of heads 201 scans the moving tape 10 and fixed tape 207, the input signal will be multiplied by a portion of the output signal and the result integrated in integrator 325.

As the drum 200 rotates, the set of heads 201 is disengaged from the moving tape 10 and the fixed tape 207. At the same time the set of heads 202 comes into engagement with the fixed tape 207 and the moving tape 10. As the drum 200 continues rotation there will again be reproduced the input signal and a portion of the output signal. However, since the tape 10 has been moving slowly during the previous scan, the portion of the output signal which is scanned by the set of heads 202 will be time-shifted with respect to the portion played back during the first scan. This operation continues with the input signal being multiplied and integrated with a portion of the output signal on each scan of heads 201 or 202 across the moving and fixed tapes. Each scan results in the multiplication and integration of the input signal with the different time-shifted portions of the output signal. This continues until the moving tape has been completely taken up on the takeup reel 211.

In this manner there has been produced in a rapid and accurate manner a complete correlation of the input signal with the output signal.

While a particular embodiment of the invention has been shown and described, it will, of course, be understood that various modifications may be made without departing from the principles of the invention.

What is claimed is:

1. Apparatus for cross-correlating an input signal with an output signal comprising:
    a magnetic tape transport system for transporting a moving tape at a constant speed, said output signal being recorded on said moving tape,
    a fixed magnetic tape having said input signal recorded thereon,
    a rotatable drum having at least first and second transducer heads mounted on the periphery thereof, said fixed magnetic tape and said moving tape being positioned in side-by-side relationship on the periphery of said rotatable drum, said first transducer head being positioned in proximity to said moving tape for playing back said output signal, said second transducer head being disposed in proximity to said fixed magnetic tape for playing back said input signal,
    means for rotating said rotatable drum at a rate which is high compared to the constant speed of said moving tape so that upon each rotation of said rotatable drum said first transducer head reproduces a different portion of said output signal and said second transducer head reproduces said input signal,
    an analog multiplier,
    means for connecting said first and said second transducer heads to said analog multiplier, and
    an analog integrator, the output of said analog multiplier being connected to said analog intergrator so that the output of said analog intergrator is a signal representing the cross-correlation of said input signal and said output signal.

2. The apparatus recited in claim 1 further including:
    third and fourth transducer heads mounted on said rotatable drum at a position which is 180° of rotation from said first and said second transducer heads,
    means for holding said fixed magnetic tape about at least 180° of the periphery of said rotatable drum, and
    guide means for guiding said moving tape around 180° of rotation of said rotatable drum so that said first and said second transducer heads are detecting signals on said fixed magnetic tape and said moving tape when said third and said fourth transducer heads are not, and so that said third and said fourth transducer heads are detecting signals on said fixed magnetic tape and said moving tape when said first and said second transducer heads are not.

3. The apparatus recited in claim 1 in which said input signal is recorded on a track on said moving tape and further in which there is included a transfer system for transferring said input signal from said moving tape to said fixed magnetic tape comprising:

a transfer head mounted on said rotatable drum and disposed in playback relationship to said track on said moving tape, and transfer circuitry for selectively connecting said transfer head to said second transducer head so that said transfer head plays back said input signal for recording on said fixed magnetic tape by said second transducer head.

4. Apparatus for cross-correlating an input signal, representing vibrational energy transmitted into the earth, with an output signal, representing the detection of said vibrational energy after it has traveled through subsurface formations, said input signal and said output signal being recorded on first and second tracks of a magnetic tape, said apparatus comprising:

a tape trnsport for transporting said magnetic tape at a constant speed, a rotatable drum including at least first and second playback heads and one playback-record head mounted on the periphery thereof, guiding means for positioning said magnetic tape so that said first and said second tracks are disposed in a playback relationship with said first and said second playback heads respectively, a fixed magnetic recording medium disposed around the periphery of said drum and in playback and recording relationship with said playback-record head, means for selectively connecting said second playback head to said playback-record head so that said input signal is transferred to said fixed magnetic recording medium, means for driving said rotatable drum at a speed which is high compared with the constant speed of said magnetic tape so that upon each rotation of said drum said first playback head produces a different portion of said output signal and said playback record head produces said input signal, an analog multiplier, means for connecting said playback-record head and said first playback head to said analog multiplier, and an integrator, the output of said analog multiplier being connected to said integrator so that there is produced at the output of said integrator a signal representing the cross-correlation of said input signal and said output signal.

5. The apparatus recited in claim 4 further including:

third and fourth playback heads and second playback-record head mounted on said rotatable drum at a position which is 180° of rotation from said first and said second playback heads and said first playback-record head, means for holding said fixed magnetic recording medium about at least 180° of the periphery of said rotatable drum, and guide means for guiding said magnetic tape around 180° of rotation of said rotatable drum so that said first and said second playback heads and said first playback-record head are detecting signals on said fixed magnetic recording medium and said magnetic tape when said third and said fourth playback heads and said second playback-record head are not, and so that said third and said fourth playback heads and said second playback-record head are detecting signals on said fixed magnetic recording medium and said magnetic tape when said first and said second playback heads and said first playback-record head are not.

6. Apparatus for cross-correlating an input signal with an output signal comprising:

a magnetic tape transport system for transporting a moving magnetic tape at a constant speed, said input signal and said output signal being recorded on said moving magnetic tape, a fixed magnetic tape for having said input signal recorded thereon, a rotatable drum including at least first and second playback heads and first playback-record head mounted on the periphery thereof, said fixed magnetic tape and said moving magnetic tape being positioned in side-by-side relationship on the periphery of said rotatable drum and extending about at least 180° of said rotatable drum, said first playback head and said second playback head being positioned in proximity to said moving magnetic tape for playing back said input signal and said output signal and said first playback-record head being positioned in proximity to said fixed magnetic tape for recording thereon and playing back therefrom said input signal, means for selectively connecting said first playback head to said first playback-record head so that said input signal is transferred to said fixed magnetic recording medium, means for rotating said rotatable drum at a rate which is high compared to the constant speed of said moving magnetic tape so that upon one rotation of said rotatable drum said first playback head plays back said input signal and said first playback-record head records said input signal on said fixed magnetic tape and thereafter upon each rotation of said rotatable drum said second playback head reproduces a different portion of said output signal and said first playback-record head reproduces said input signal, an analog multiplier having a first input and a second input, means for connecting said output of said playback-record head to said first input of said analog multiplier and said output of said first playback head to said second input of said analog multiplier, an analog integrator, and means for applying the output of said analog multiplier to said analog integrator so that said analog integrator will produce a signal representing the cross-correlation of said input signal and said output signal.

References Cited

UNITED STATES PATENTS 3,100,297   8/1963   Reines   235—181 X
3,174,142   3/1965   Mallinckrodt   235—181 X MALCOLM A. MORRISON, *Primary Examiner.*

FELIX D. GRUBER, *Assistant Examiner.*

U.S. Cl. X.R.

179—100.2; 340—15.5